(12) United States Patent
Park et al.

(10) Patent No.: US 9,330,845 B2
(45) Date of Patent: May 3, 2016

(54) DIELECTRIC COMPOSITION AND MULTI-LAYERED CERAMIC CAPACITOR

(71) Applicant: SAMSUNG ELECTRO-MECHANICS CO., LTD., Suwon-Si, Gyeonggi-Do (KR)

(72) Inventors: Jae Sung Park, Suwon-Si (KR); Sang Hyuk Kim, Suwon-Si (KR); Chan Hee Nam, Suwon-Si (KR); Chang Hoon Kim, Suwon-Si (KR); Seok Hyun Yoon, Suwon-Si (KR); Doo Young Kim, Suwon-Si (KR)

(73) Assignee: SAMSUNG ELECTRO-MECHANICS CO., LTD., Suwon-si, Gyeonggi-do (KR)

(*) Notice: Subject to any disclaimer, the term of this patent is extended or adjusted under 35 U.S.C. 154(b) by 0 days.

(21) Appl. No.: 14/322,521

(22) Filed: Jul. 2, 2014

(65) Prior Publication Data

US 2015/0016017 A1    Jan. 15, 2015

(30) Foreign Application Priority Data

Jul. 2, 2013 (KR) .......................... 10-2013-0076985

(51) Int. Cl.
*C04B 35/622* (2006.01)
*H01G 4/12* (2006.01)
(Continued)

(52) U.S. Cl.
CPC .......... *H01G 4/1227* (2013.01); *C04B 35/4682* (2013.01); *C04B 35/47* (2013.01); *H01G 4/12* (2013.01); *H01G 4/30* (2013.01); *C04B 2235/3206* (2013.01);
(Continued)

(58) Field of Classification Search
CPC .... C04B 35/46; C04B 35/462; C04B 35/465; C04B 35/468; C04B 35/4682; C04B 35/47; C04B 35/475; C04B 35/478; C04B 2235/768; C04B 35/622; C04B 40/0042
See application file for complete search history.

(56) References Cited

U.S. PATENT DOCUMENTS 5,650,367 A * 7/1997 Fujikawa et al. .............. 501/139
6,268,054 B1 * 7/2001 Costantino et al. ........... 428/403
(Continued)

FOREIGN PATENT DOCUMENTS

JP     2004-256362 A    9/2004
JP     2005-145761 A    6/2005
KR  10-2003-0065200 A    8/2003

*Primary Examiner* — Noah Wiese
(74) *Attorney, Agent, or Firm* — McDermott Will & Emery LLP

(57) ABSTRACT

A dielectric composition may include a first dielectric powder; and a second dielectric powder having an average grain size smaller than that of the first dielectric powder and included in the dielectric composition in an amount of 0.01 to 1.5 parts by weight based on 100 parts by weight of the first dielectric powder, and a multilayer ceramic capacitor formed using the same. A multilayer ceramic capacitor may include: a ceramic body including dielectric layers; first and second internal electrodes disposed in the ceramic body to face each other with the respective dielectric layers interposed therebetween; and first and second external electrodes electrically connected to the first and second internal electrodes, respectively. The dielectric layers are formed of a dielectric composition including a first dielectric powder and a second dielectric powder having an average grain size smaller than that of the first dielectric powder and included in the dielectric composition in an amount of 0.01 to 1.5 parts by weight based on 100 parts by weight of the first dielectric powder.

9 Claims, 4 Drawing Sheets

(51) Int. Cl.
*H01G 4/30* (2006.01)
*C04B 35/468* (2006.01)
*C04B 35/47* (2006.01)

(52) U.S. Cl.
CPC ............ *C04B 2235/3239* (2013.01); *C04B 2235/3241* (2013.01); *C04B 2235/3262* (2013.01); *C04B 2235/3272* (2013.01); *C04B 2235/3275* (2013.01); *C04B 2235/3279* (2013.01); *C04B 2235/3281* (2013.01); *C04B 2235/3284* (2013.01); *C04B 2235/5445* (2013.01); *C04B 2235/5454* (2013.01); *C04B 2235/5472* (2013.01); *C04B 2235/768* (2013.01); *C04B 2235/77* (2013.01); *Y10T 428/2982* (2015.01)

(56) References Cited

U.S. PATENT DOCUMENTS

| | | | |
|---|---|---|---|
| 7,433,173 B2 * | 10/2008 | Iwasaki et al. | 361/321.4 |
| 7,706,125 B2 * | 4/2010 | Fukuda et al. | 361/311 |
| 2005/0143253 A1 * | 6/2005 | Na et al. | 501/103 |
| 2007/0287625 A1 * | 12/2007 | Yanagida et al. | 501/138 |
| 2009/0059471 A1 * | 3/2009 | Fukuda et al. | 361/321.4 |
| 2010/0067171 A1 * | 3/2010 | Yamazaki et al. | 361/321.4 |

* cited by examiner

A-A'

DIELECTRIC COMPOSITION AND MULTI-LAYERED CERAMIC CAPACITOR

CROSS-REFERENCE TO RELATED APPLICATION

This application claims the benefit of Korean Patent Application No. 10-2013-0076985 filed on Jul. 2, 2013, with the Korean Intellectual Property Office, the disclosure of which is incorporated herein by reference.

BACKGROUND

The present disclosure relates to a dielectric composition and a multilayer ceramic capacitor formed using the same.

Generally, electronic components using a ceramic material, such as a capacitor, an inductor, a piezoelectric element, a varistor, a thermistor, or the like, include a ceramic body made of a ceramic material, internal electrodes formed in the ceramic body, and external electrodes mounted on external surfaces of the ceramic body so as to be connected to the internal electrodes.

Among ceramic electronic components, a multilayer ceramic capacitor includes a plurality of stacked dielectric layers, internal electrodes disposed to face each other with the dielectric layer interposed therebetween, and external electrodes electrically connected to the internal electrodes.

Multilayer ceramic capacitors have been widely used as components in mobile communications devices such as laptop computers, personal digital assistants (PDAs), mobile phones, and the like, due to advantages thereof such as a small size, high capacitance, ease of mounting, or the like.

In general, the multilayer ceramic capacitor is manufactured by applying a conductive paste for an internal electrode and a dielectric paste using a sheet method, a printing method, or the like, and simultaneously sintering the applied pastes.

Electrical features of the multilayer ceramic capacitor may be changed according to types and features of dielectric powder contained in the dielectric paste.

Therefore, in order to manufacture a multilayer ceramic capacitor having high reliability, a dielectric composition having high permittivity and excellent electrical properties is required.

SUMMARY

An exemplary embodiment in the present disclosure may provide a dielectric composition having excellent electrical properties, and a multilayer ceramic capacitor using the same.

According to an exemplary embodiment in the present disclosure, a dielectric composition may include: a first dielectric powder; and a second dielectric powder having an average grain size smaller than that of the first dielectric powder and included in the dielectric composition in an amount of 0.01 to 1.5 parts by weight based on 100 parts by weight of the first dielectric powder.

When the average grain size of the first dielectric powder is defined as a and the average grain size of the second dielectric powder is defined as b, $b/a \leq 1/10$ may be satisfied.

The dielectric composition may further include a first accessory component containing at least one selected from a group consisting of manganese (Mn), vanadium (V), chromium (Cr), iron (Fe), nickel (Ni), cobalt (Co), copper (Cu), and zinc (Zn).

The first accessory component may be included in an amount of 0.1 to 1.0 parts by weight based on 100 parts by weight of a dielectric main component contained in the first dielectric powder and the second dielectric powder.

The dielectric composition may further include a second accessory component containing at least one selected from a group consisting of magnesium (Mg) and aluminum (Al).

The second accessory component may be included in an amount of 0.1 to 1.0 parts by weight based on 100 parts by weight of a dielectric main component contained in the first dielectric powder and the second dielectric powder.

According to an exemplary embodiment in the present disclosure, a multilayer ceramic capacitor may include: a ceramic body including dielectric layers; first and second internal electrodes disposed in the ceramic body to face each other with the respective dielectric layers interposed therebetween; and first and second external electrodes electrically connected to the first and second internal electrodes, respectively, wherein the dielectric layers are formed of a dielectric composition including a first dielectric powder and a second dielectric powder having an average grain size smaller than that of the first dielectric powder and included in the dielectric composition in an amount of 0.01 to 1.5 parts by weight based on 100 parts by weight of the first dielectric powder.

When the average grain size of the first dielectric powder is defined as a and the average grain size of the second dielectric powder is defined as b, $b/a \leq 1/10$ may be satisfied.

The dielectric layers may contain dielectric grains and the dielectric grains may have an average grain size of 0.1 to 2.0 μm.

The dielectric composition may further include a first accessory component containing at least one selected from a group consisting of manganese (Mn), vanadium (V), chromium (Cr), iron (Fe), nickel (Ni), cobalt (Co), copper (Cu), and zinc (Zn).

The first accessory component may be included in an amount of 0.1 to 1.0 parts by weight based on 100 parts by weight of a dielectric main component contained in the first dielectric powder and the second dielectric powder.

The dielectric composition may further contain a second accessory component containing at least one selected from a group consisting of magnesium (Mg) and aluminum (Al).

The second accessory component may be included in an amount of 0.1 to 1.0 parts by weight based on 100 parts by weight of a dielectric main component contained in the first dielectric powder and the second dielectric powder.

BRIEF DESCRIPTION OF DRAWINGS

The above and other aspects, features and other advantages of the embodiments in the present disclosure will be more clearly understood from the following detailed description taken in conjunction with the accompanying drawings, in which.

DETAILED DESCRIPTION

Figure 1:
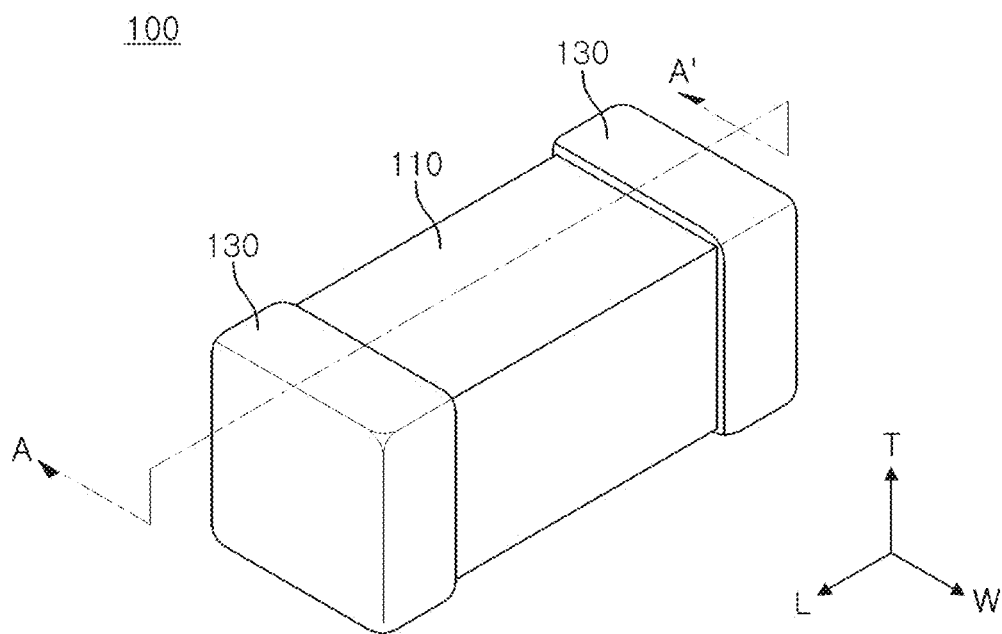
FIG. 1 is a perspective view schematically showing a multilayer ceramic capacitor according to an exemplary embodiment in the present disclosure.

Exemplary embodiments in the present disclosure will now be described in detail with reference to the accompanying drawings. The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity, and the same reference numerals will be used throughout to designate the same or like elements.

Hereinafter, the dielectric composition and a multilayer ceramic capacitor formed using the same according to exemplary embodiments in the present disclosure will now be described with reference to the accompanying drawings.

FIG. 1 is a perspective view schematically showing a multilayer ceramic capacitor according to an exemplary embodiment in the present disclosure.

Figure 2:
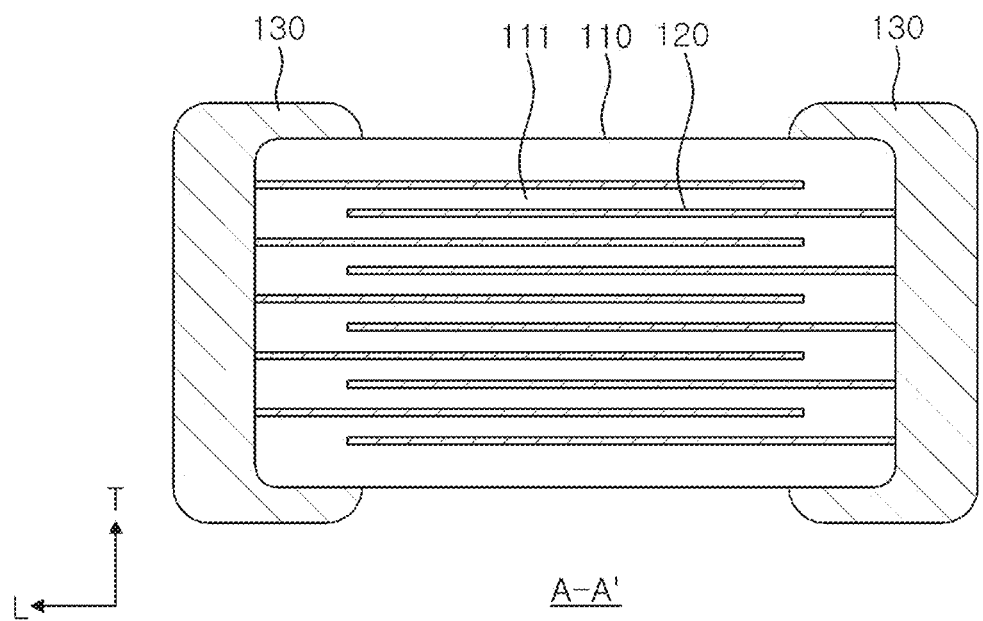
FIG. 2 is a cross-sectional view taken along line A-A' of FIG. 1.

FIG. 2 is a cross-sectional view taken along line A-A' of FIG. 1.

Referring to FIGS. 1 and 2, a multilayer ceramic capacitor 100 according to an exemplary embodiment in the present disclosure may include a ceramic body 110; and first and second external electrodes 130.

A shape of the ceramic body 110 is not particularly limited, but may be a hexahedral shape as shown. At the time of sintering a chip, due to sintering shrinkage of ceramic powder, the ceramic body 110 does not have a hexahedral shape with a complete straight line but may have a substantially hexahedral shape.

As shown in FIG. 2, an exploded perspective view of the ceramic body 110, the ceramic body may include a plurality of dielectric layers 111 and first and second internal electrodes 120 formed on the dielectric layers 111, and may be formed by stacking the plurality of dielectric layers on which the internal electrodes are formed. In addition, the first and second internal electrodes may be disposed to face each other with the respective dielectric layers 111 interposed therebetween.

According to an exemplary embodiment in the present disclosure, the plurality of dielectric layers 111 configuring the ceramic body 110 may be in a sintered state, and adjacent dielectric layers may be integrated with each other so that boundaries therebetween are not readily apparent.

The dielectric layers 111 may be formed of a dielectric composition containing a first dielectric powder; and a second dielectric powder.

An average grain size of the second dielectric powder may be smaller than an average grain size of the first dielectric powder. Second dielectric powder grains may be disposed in space between first dielectric powder grains to thereby improve a filling density of the dielectric composition.

Further, when the average grain size of the first dielectric powder is defined as a, and the average grain size of the second dielectric powder is defined as b, b/a may satisfy the following Equation: $b/a \leq 1/10$.

In the case in which the average grain size of the second dielectric powder is greater than $1/10$ of the average grain size of the first dielectric powder, it may be difficult to dispose the second dielectric powder grains in the space between the first dielectric powder grains, and even when the second dielectric powder grains are disposed in the space between the first dielectric powder grains, an interval between the first dielectric powder grains may be increased, such that it may be difficult to improve the filling density.

The second dielectric power may be included in an amount of 0.01 to 1.5 parts by weight based on 100 parts by weight of the first dielectric powder.

In the case in which the content of the second dielectric power contained in the dielectric composition is less than 0.01 parts by weight based on 100 parts by weight of the first dielectric powder, effects of increasing density in the dielectric layer formed using the dielectric composition may not be present, and in the case in which the content of the second dielectric power contained in the dielectric composition is greater than 1.5 parts by weight based on 100 parts by weight of the first dielectric powder, it may be difficult to control a micro-structure, and a value of dissipation factor (DF) may be significantly increased.

That is, in the case of using the dielectric composition in which the content of the contained second dielectric power is equal to or more than 0.01 parts by weight based on 100 parts by weight of first dielectric powder, the density and permittivity of the correspondingly formed dielectric layer may be improved, and in the case in which the content of the contained second dielectric power is equal to or less than 1.5 parts by weight based on 100 parts by weight of first dielectric powder, the density and permittivity may be improved, and the micro structure may be easily controlled, such that abnormal grain growth is not generated, and the value of dissipation factor (DF) value may not be increased.

The first dielectric powder and the second dielectric powder may contain a ceramic powder having high permittivity as a dielectric main component, for example, a barium titanate ($BaTiO_3$) based powder or strontium titanate ($SrTiO_3$) based powder, but the present disclosure is not limited thereto.

In addition, the dielectric composition according to an exemplary embodiment in the present disclosure may include 40 to 99 wt % of barium titanate ($BaTiO_3$) and 1 to 60 wt % of barium titanate zirconate ($Ba(Ti_{1-x}Zr_x)O_3$) as the dielectric main component.

In the case of barium titanate zirconate in which zirconium (Zr) is substituted at a B site (Ti site) of barium titanate, permittivity is increased at a Curie temperature as compared to pure barium titanate, and the Curie temperature tends to shift to low temperature, such that the barium titanate zirconate may be effective in increasing the permittivity. In addition, band gap energy is increased due to the substitution of zirconium, such that insulation properties may be improved under conditions in which the same grain sizes are provided. However, in the case of barium titanate zirconate, a higher degree of grain growth may be generated at the same sintering temperature as compared to the case of pure barium titanate. In the case in which a micro-structure effect as described above dominantly acts, defects such as deterioration in temperature stability of capacitance (TCC characteristics), a degradation indirect current (DC)-bias characteristics due to excessively large grains, deterioration in reliability due to a decrease in the number of grains in each layer, and the like, may be caused.

Therefore, the dielectric composition according to an exemplary embodiment in the present disclosure may solve the above-mentioned limitations by including 40 to 99 wt % of barium titanate and 1 to 60 wt % of barium titanate zirconate as the dielectric main component.

In the case in which the content of barium titanate zirconate is less than 1 wt %, there is no effect of increasing permittivity, and in the case in which the content of barium titanate zirconate is greater than 60 wt %, an effect of suppressing movement of a charge carrier is inhibited due to excessive grain growth, such that the insulation properties may be deteriorated. Therefore, in the case in which a mixing ratio of barium titanate and barium titanate zirconate is 40 to 99 wt % of barium titanate and 1 to 60 wt % of barium titanate zirconate, the dielectric composition capable of having increased permittivity and an improved insulation properties may be obtained.

Further, the dielectric composition according to an exemplary embodiment in the present disclosure may further contain a first accessory component including at least one variable valence acceptor element selected from a group consisting of manganese (Mn), vanadium (V), chromium (Cr), iron (Fe), nickel (Ni), cobalt (Co), copper (Cu), and zinc (Zn), wherein the first accessory component may be included in an amount of 0.1 to 1.0 parts by weight based on 100 parts by weight of the dielectric main component contained in the first dielectric powder and the second dielectric powder.

In the case in which the content of the first accessory component is less than 0.1 parts by weight, reduction resistance and reliability may be deteriorated, and in the case in which the content of the first accessory component is greater than 1.0 part by weight, side effects such as an increase in the sintering temperature and a decrease in capacitance may be generated.

In addition, the dielectric composition according to an exemplary embodiment in the present disclosure may further contain at least one fixed valence acceptor element selected from a group consisting of magnesium (Mg) and aluminum (Al) as a second accessory component. The second accessory component may be included in an amount of 0.1 to 1.0 parts by weight based on 100 parts by weight of the dielectric main component contained in the first dielectric powder and the second dielectric powder.

In the case in which the content of the second accessory component is less than 0.1 parts by weight, reduction resistance and reliability may be deteriorated, and in the case in which the content of the second accessory component is greater than 1.0 part by weight, the sintering temperature and an aging rate may be increased.

The first and second accessory components may be contained in oxide or carbonate forms of the variable valence acceptor element and the fixed valence acceptor element.

Further, in order to implement desired characteristics, the dielectric composition may further contain an element selected from a group consisting of cesium (Ce), niobium (Nb), lanthanum (La), antimony (Sb), silicon (Si), barium (Ba), calcium (Ca), and aluminum (Al), an oxide thereof, a carbonate thereof, or a mixture thereof as an additive.

The dielectric layers may be formed by sintering ceramic green sheets further containing a solvent and an organic binder in addition to the above-mentioned dielectric composition.

According to the embodiment in the present disclosure, the first and second internal electrodes may be formed of a conductive paste containing a conductive metal. The conductive metal may be nickel (Ni), copper (Cu), palladium (Pd), or an alloy thereof, but is not limited thereto.

Further, the internal electrodes may be printed on the ceramic green sheets forming the dielectric layers using the conductive paste through a printing method such as a screen printing method or a gravure printing method, but is not limited thereto. The ceramic body 110 may be formed by alternately stacking and sintering the ceramic green sheets having the internal electrodes printed thereon.

Next, the first and second external electrodes 130 may be formed to be electrically connected to the first and second internal electrodes 120, respectively. The first and second external electrodes 130 may contain a conductive metal, and the conductive metal may be nickel (Ni), copper (Cu), tin (Sn), or an alloy thereof, but is not limited thereto.

The dielectric layers 111 of the multilayer ceramic capacitor 100 manufactured as described above may include dielectric grains, wherein the dielectric grains may have an average grain size of 0.1 μm to 2.0 μm.

In the case in which the average grain size of the dielectric grain is less than 0.1 μm, which is the case in which sufficient grain growth does not occur during sintering, permittivity may be significantly low, and the dissipation factor (DF) may be increased, and in the case in which the average grain size is greater than 2.0 μm, permittivity may be increased, but reliability may be significantly decreased, and TCC and DC-bias characteristics may also be decreased.

In descriptions of the multilayer ceramic capacitor according to the embodiment, contents thereof overlapped with the description of the dielectric composition according to the foregoing embodiment in the present disclosure will be omitted in order to avoid an overlapped description.

Grain size distribution of the dielectric grains contained in the dielectric layers 111 may satisfy $1.1 \leq D_{100}/D_1 \leq 30$. In the case of arranging 100 dielectric grains contained in the dielectric layer depending on sizes thereof after sintering, a size of a 100-th grain having the largest grain size may be defined as $D_{100}$, and a size of a first grain having the smallest grain size may be defined as $D_1$. That is, a size ratio of the smallest grain to the largest grain is not greater than 30, such that a multilayer ceramic capacitor having high reliability may be obtained.

In an exemplary embodiment in the present disclosure, the dielectric layers are formed using the dielectric composition in which dielectric powder grains having different sizes are mixed with each other, such that the density of the dielectric layer may be increased, and the electrical properties of the multilayer ceramic capacitor may be improved.

EXPERIMENTAL EXAMPLE

After a first dielectric power and a second dielectric powder were mixed according to compositions shown in the following Table 1, ethanol and toluene were used as solvents and stirred in the mixture, together with a dispersant, thereby manufacturing a ceramic sheet. In Experimental Example, a barium titanate powder having an average grain size of 180 nm was used as the first dielectric powder, and a barium titanate powder having an average grain size of 10 nm was used as the second dielectric powder.

Upper and lower covers were manufactured by stacking 30 cover sheets having a thickness of 10 to 15 μm, and an active layer was manufactured by stacking 20 sheets including nickel (Ni) internal electrodes printed thereon and having a thickness of 3 to 5 μm, thereby preparing a chip having a size of 3.2 mm×1.6 mm (3216 size). After the chip was plasticized for de-binding, sintering was performed at about 1100° C. for 1 hour, and sintering was performed at 1160° C. and 1170° C. Then, electrical properties of the chip were measured.

The following Table 1 shows data on characteristics of the multilayer ceramic capacitors formed according to the mixing ratios of the second dielectric powder to the first dielectric powder contained in the dielectric composition. As the characteristics, densities of ceramic bodies sintered at 1160° C. and 1170° C. after a sintering process, dielectric characteristics, and dissipation factor characteristics were measured.

TABLE 1

| | First Dielectric Powder (Part by Weight) | Second Dieletric Powder (Part by Weight) | Sintering at 1160° C. | | | Sintering at 1170° C. | | |
|---|---|---|---|---|---|---|---|---|
| Sample | | | Density of Ceramic Body (g/cm³) | Dielectric Characteristics | Dissipation Factor Characteristics | Density of Ceramic Body (g/cm³) | Dielectric Characteristics | Dissipation Factor Characteristics |
| 1* | 100 | 0 | 5.78 | ○ | ○ | 5.83 | ○ | ○ |
| 2 | 100 | 0.01 | 5.80 | ○ | ○ | 5.85 | ○ | ○ |
| 3 | 100 | 0.1 | 5.82 | ○ | ○ | 5.85 | ○ | ○ |
| 4 | 100 | 0.5 | 5.85 | ○ | ○ | 5.86 | ○ | ○ |
| 5 | 100 | 1.0 | 5.88 | ○ | ○ | 5.89 | ○ | ○ |
| 6 | 100 | 1.5 | 5.92 | ○ | ○ | 5.93 | ○ | ○ |
| 7* | 100 | 1.7 | 5.93 | ○ | ○ | 5.95 | x | x |
| 8* | 100 | 2.0 | 5.93 | ○ | ○ | 5.95 | x | x |

*Comparative Example
○: Satisfactory, x: Unsatisfactory

As shown in Table 1, at the time of sintering at 1170° C., in the case in which the second dielectric powder was added in an amount higher than 1.5 parts by weight, grain growth excessively occurred, such that the dielectric characteristics and dissipation factor characteristics were deteriorated. Until the average grain size of the dielectric material reached a predetermined size, permittivity was continuously increased, but in a case in which the average grain size was increased to the predetermined size or more, permittivity tended to be rather decreased. Particularly, in the case in which the content of the second dielectric powder was greater than 1.5 parts by weight, the dielectric characteristics were deteriorated due to excessive grain growth, such that a side effect such as an increase in the dissipation factor was generated.

Particularly, when the sintering temperature was increased, an influence depending on the content of the second dielectric powder was further increased. In the case in which the sintering was performed at 1160° C., when the second dielectric powder was added in an amount higher than 1.7 parts by weight, the dielectric characteristics and the dissipation factor were deteriorated, but in the case in which the sintering was performed at 1170° C., when the second dielectric powder was added in an amount higher than 1.5 parts by weight, the dielectric characteristics and the dissipation factor were deteriorated.

In other words, as shown in Table 1, in the case in which the second dielectric powder was contained in the dielectric composition in an amount higher than 1.5 parts by weight, the dielectric characteristics and dissipation factor characteristics of the formed multilayer ceramic capacitor were deteriorated.

Figure 3:
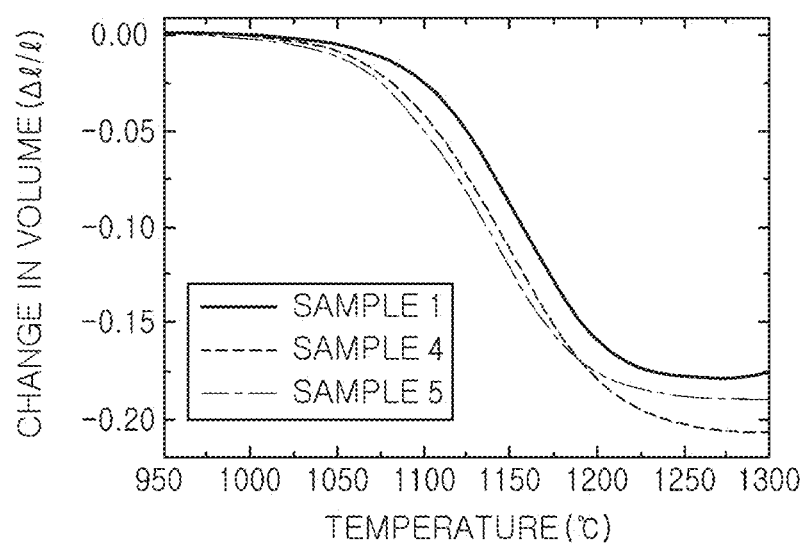
FIG. 3 is a graph showing changes in volume of dielectric compositions according to Experimental Example in the present disclosure, depending on temperature.
Figure 4A:
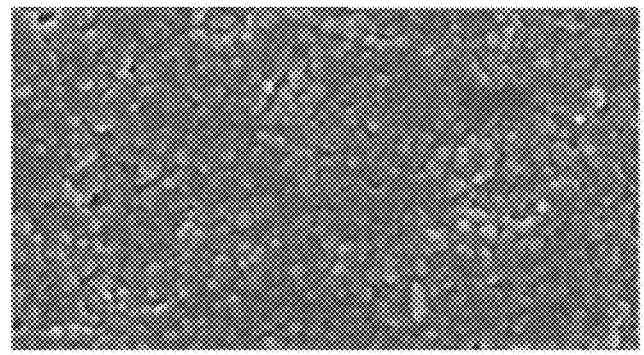
FIGS. 4A through 4E are scanning electronic microscope (SEM) photographs showing micro-structures of dielectric layers formed using the dielectric compositions according to Experimental Example.
Figure 4B:
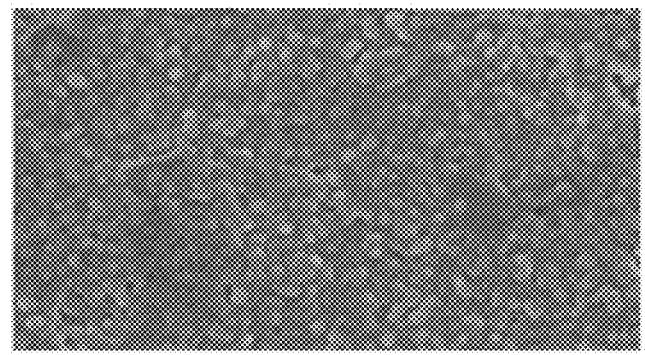
Figure 4C:
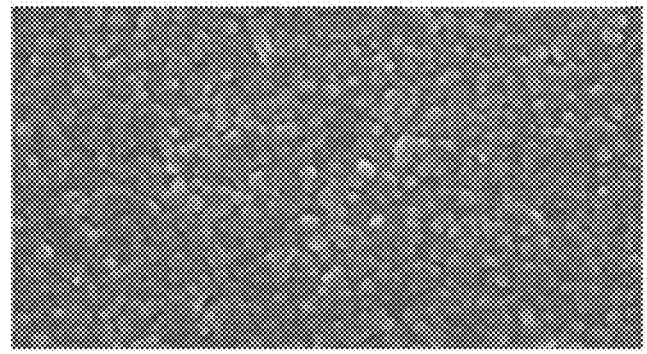
Figure 4D:
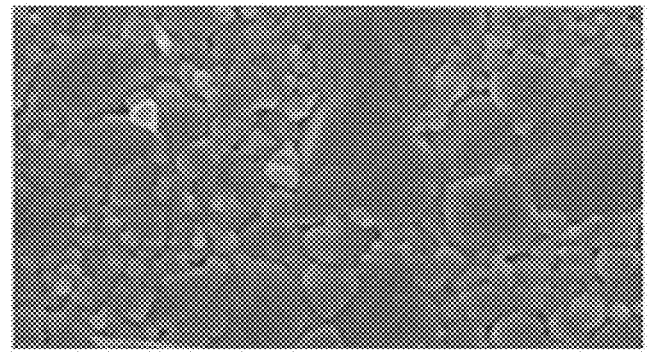
Figure 4E:
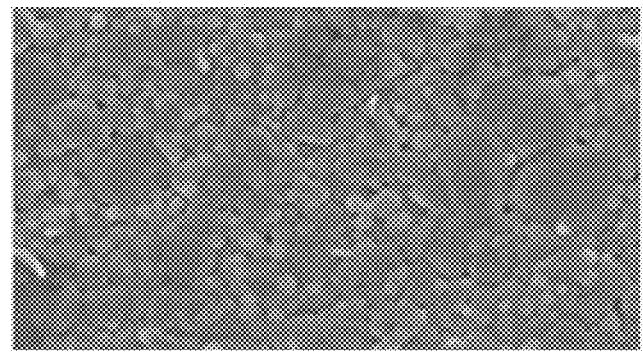

FIG. 3 is a graph showing changes in volume of dielectric compositions of sample 1, sample 4, and sample 5 shown in Table 1, depending on temperature. It may be appreciated that unlike sample 1 in which the second dielectric powder was not contained, in the case of sample 4 and sample 5, the volume of the dielectric composition was significantly decreased after sintering, such that it could be confirmed that the dielectric composition had a high filling density.

FIGS. 4A through 4E are scanning electronic microscope (SEM) photographs showing micro-structures of dielectric layers formed using the dielectric compositions of sample 1, sample 4, sample 5, sample 7, and sample 8 shown in Table 1, respectively.

As shown in FIGS. 4A through 4E, it may be confirmed that in the case in which the second dielectric powder was added in an amount higher than 1.5 parts by weight, coarse grains were formed due to excessive grain growth.

Therefore, it may be appreciated that preferably, the second dielectric powder may be contained in the dielectric composition in an amount of 0.01 to 1.5 parts by weight based on 100 parts by weight of the first dielectric powder.

As set forth above, according to exemplary embodiments in the present disclosure, the dielectric composition having excellent electrical properties, and the multilayer ceramic capacitor using the dielectric composition may be manufactured.

While exemplary embodiments have been shown and described above, it will be apparent to those skilled in the art that modifications and variations could be made without departing from the scope of the invention as defined by the appended claims.

What is claimed is:

1. A dielectric composition comprising:
   a first dielectric powder;
   a second dielectric powder having an average grain size smaller than that of the first dielectric powder and included in the dielectric composition in an amount of 0.01 to 1.5 parts by weight based on 100 parts by weight of the first dielectric powder; and
   a first accessory component containing at least one selected from a group consisting of manganese (Mn), vanadium (V), chromium (Cr), iron (Fe), nickel (Ni), cobalt (Co), copper (Cu), and zinc (Zn),
   wherein the first accessory component is included in an amount of 0.1 to 1.0 parts by weight based on 100 parts by weight of a dielectric main component contained in the first dielectric powder and the second dielectric powder.

2. The dielectric composition of claim 1, wherein when the average grain size of the first dielectric powder is defined as a and the average grain size of the second dielectric powder is defined as b, $b/a \leq 1/10$ is satisfied.

3. The dielectric composition of claim 1, further comprising: a second accessory component containing at least one selected from a group consisting of magnesium (Mg) and aluminum (Al).

4. The dielectric composition of claim 3, wherein the second accessory component is included in an amount of 0.1 to 1.0 parts by weight based on 100 parts by weight of a dielectric main component contained in the first dielectric powder and the second dielectric powder.

5. A multilayer ceramic capacitor comprising:
   a ceramic body including dielectric layers;
   first and second internal electrodes disposed in the ceramic body to face each other with the respective dielectric layers interposed therebetween; and first and second external electrodes electrically connected to the first and second internal electrodes, respectively, wherein the dielectric layers include a dielectric composition including a first dielectric powder and a second dielectric powder having an average grain size smaller than that of the first dielectric powder and included in the dielectric composition in an amount of 0.01 to 1.5 parts by weight based on 100 parts by weight of the first dielectric powder, wherein the dielectric composition further includes a first accessory component containing at least one selected from a group consisting of manganese (Mn), vanadium (V), chromium (Cr), iron (Fe), nickel (Ni), cobalt (Co), copper (Cu), and zinc (Zn), and the first accessory component is included in an amount of 0.1 to 1.0 parts by weight based on 100 parts by weight of a dielectric main component contained in the first dielectric powder and the second dielectric powder.

6. The multilayer ceramic capacitor of claim 5, wherein when the average grain size of the first dielectric powder is defined as a and the average grain size of the second dielectric powder is defined as b, $b/a \leq 1/10$ is satisfied.

7. The multilayer ceramic capacitor of claim 5, wherein the dielectric layers contain dielectric grains and the dielectric grains have an average grain size of 0.1 μm to 2.0 μm.

8. The multilayer ceramic capacitor of claim 5, wherein the dielectric composition further includes a second accessory component containing at least one selected from a group consisting of magnesium (Mg) and aluminum (Al).

9. The multilayer ceramic capacitor of claim 8, wherein the second accessory component is included in an amount of 0.1 to 1.0 parts by weight based on 100 parts by weight of a dielectric main component contained in the first dielectric powder and the second dielectric powder.

* * * * *